United States Patent
Tran et al.

[11] Patent Number: 6,116,091
[45] Date of Patent: Sep. 12, 2000

[54] SYSTEM FOR DIAGNOSING UNEXPECTED NOISE IN A MULTI-COMPONENT ASSEMBLY

[75] Inventors: Vy Tran, Canton; Bill Covitz, Plymouth; Gary Boes, Ann Arbor; Keng D. Hsueh, West Bloomfield; Andrew Phillips, Plymouth, all of Mich.; Christopher Robert Fuller, Virginia Beach; Francois Charette, Blacksburg, both of Va.

[73] Assignee: Ford Global Technologies, Inc., Dearborn, Mich.

[21] Appl. No.: 09/111,680

[22] Filed: Jul. 8, 1998

[51] Int. Cl.[7] ..................................................... G01M 7/02
[52] U.S. Cl. ............................. 73/669; 73/1.82; 73/662
[58] Field of Search ............................. 73/669, 668, 662, 73/663, 664, 1.82

[56] References Cited

U.S. PATENT DOCUMENTS

| | | | |
|---|---|---|---|
| 3,695,098 | 10/1972 | Kirkland, Jr. ........................... | 73/117.1 |
| 3,748,896 | 7/1973 | Barrows ...................................... | 73/671 |
| 3,844,175 | 10/1974 | Hixson ......................................... | 73/557 |
| 4,182,190 | 1/1980 | Huber et al. ................................ | 73/669 |
| 4,507,705 | 3/1985 | Hoshino et al. . | |
| 4,537,076 | 8/1985 | Lax et al. . | |
| 4,989,158 | 1/1991 | Sloane . | |
| 5,275,388 | 1/1994 | Kobayashi et al. . | |
| 5,313,407 | 5/1994 | Tiernan et al. ........................... | 364/508 |
| 5,434,783 | 7/1995 | Pal et al. .................................. | 364/508 |
| 5,459,370 | 10/1995 | Kataoka . | |
| 5,535,131 | 7/1996 | Sanders ..................................... | 364/487 |
| 5,551,298 | 9/1996 | Rayment .................................... | 73/669 |
| 5,629,986 | 5/1997 | Shoureshi . | |
| 5,638,305 | 6/1997 | Kobayashi et al. . | |
| 5,641,904 | 6/1997 | Kopp et al. ................................ | 73/457 |
| 5,649,018 | 7/1997 | Gifford et al. . | |
| 5,758,311 | 5/1998 | Tsuji et al. ................................ | 701/111 |

*Primary Examiner*—John E. Chapman
*Attorney, Agent, or Firm*—David B. Kelley

[57] ABSTRACT

The recreation of vibration levels at certain points in a stationary vehicle interior that are representative of realistic road conditions are achieved using road measurements in conjunction with a technique known as "reciprocal filtering." The reciprocal filtering technique consists of using an inverse transfer function, or impulse response in the time domain, between an excitation transducer and an accelerometer to calculate the excitation signal needed to recreate the vibrations measured on the road when squeak and rattle are present in a component of the vehicle. A set of excitation signals may be recorded for each component in the vehicle which is suspected of producing squeak and rattle noise. When a complaint is made that a vehicle is producing squeak and rattle, a service technician may reproduce noise by inducing vibrations through a kit having a CD player, an amplifier, a bass shaker and a CD with the set of excitation signals stored on separate tracks thereof. The bass shaker is attached, for example with two side tape, to the component suspected of producing noise, and noise inducing vibrations are played from the CD, through the CD player and amplifier, to the bass shaker. In this way, squeak and rattle may be quickly identified and repaired.

15 Claims, 2 Drawing Sheets

SYSTEM FOR DIAGNOSING UNEXPECTED NOISE IN A MULTI-COMPONENT ASSEMBLY

FIELD OF THE INVENTION

The present invention relates to noise diagnosing systems and methods in general, and more specifically to systems for diagnosing unexpected noise in a multi-component assembly.

BACKGROUND OF THE INVENTION

Squeak and rattle is an audible phenomenon, typically high frequency, which results from various forms of unexpected noise. One form of such noise is caused by elements in friction under forced excitation, which can be described as buzzes, squeaks, or groans. Such noise can result in the automotive setting when a vehicle is driven over a rough road. Other types of noise are those caused by loose or flexible components with the potential for impact with other components, sometimes called rattle.

The mechanisms involved in generating squeak and rattle noise are complex and often intermittent, depending on the source of excitation. For example, squeak and rattle in a vehicle may be present when driven over a first rough road, but may not be present when driven over a second rough road with different characteristics. Thus, when a vehicle driver complains to a service technician that a squeak and rattle noise exists, it may be difficult, if not impossible, for the service technician to recreate the noise so as to identify and fix it. Furthermore, there may be other noise sources present while driving the vehicle, such as engine noise and wind noise, which make identifying the squeak and rattle difficult. Although stationary vehicle vibration systems have been developed which shake an entire vehicle in an attempt to recreate squeak and rattle, such systems are expensive, space and time consuming, and difficult to operate. The results from such systems are often no better than driving the vehicle over a road.

Therefore, a method and system which can inexpensively and accurately recreate squeak and rattle noise in a stationary vehicle would greatly facilitate the identification and repair of such noise.

SUMMARY OF THE INVENTION

The present invention overcomes the disadvantages of the related art by providing a system and method for reproducing vibrations measured in a multi-component assembly, such as an automotive vehicle, while squeak and rattle noise was present. An accelerometer is located on a target component in the vicinity of squeak and rattle during a test which produces the noise. These accelerometers gather vibrational information which are then reproduced on the stationary vehicle in order to recreate the squeak and rattle noise. The reproduction of vibration levels at certain points in a stationary vehicle interior that are representative of realistic road conditions are achieved using road measurements in conjunction with a technique known as "reciprocal filtering." The reciprocal filtering technique consists of using an inverse transfer function, or impulse response in the time domain between the excitation transducer and an accelerometer to calculate the excitation signal needed to recreate the vibrations measured on the road.

The kit of the present invention for diagnosing noise from a target component of a multi-component assembly comprises vibration generation means for vibrating the target component at a predetermined location thereof, attachment means for attaching the vibration generation means to the target component, drive means for driving the vibration generation means, and control means for controlling the vibration generation means through the drive means so as to generate a set of predetermined noise producing vibrations in the target component.

An embodiment of the comprises an amplifier, a tactile transducer, such as a base shaker, connected to the amplifier for selectively vibrating the target component at a predetermined location thereof, attachment means for attaching the vibration generation means to the target component, a compact disc (CD) player connected to the amplifier for driving the tactile transducer, and a CD having at least one set of predetermined control signals thereon for controlling the vibration generation means when played by the CD player and amplified so as to generate a set of predetermined noise producing vibrations in the target component.

An advantage of the present invention is that squeak and rattle of various components in an automotive vehicle can be identified and repaired without the need for a road test.

Another advantage is an inexpensive method for quickly and accurately identifying squeak and rattle in an automotive vehicle.

Still another advantage of the present invention is a kit based system for conveniently identifying squeak and rattle.

BRIEF DESCRIPTION OF THE DRAWINGS

These and other objects, advantages, and features of the present invention will be apparent to those skilled in the art upon reading the following description with reference to the accompanying drawings, in which.

DETAILED DESCRIPTION OF THE PREFERRED EMBODIMENTS

Figure 1:
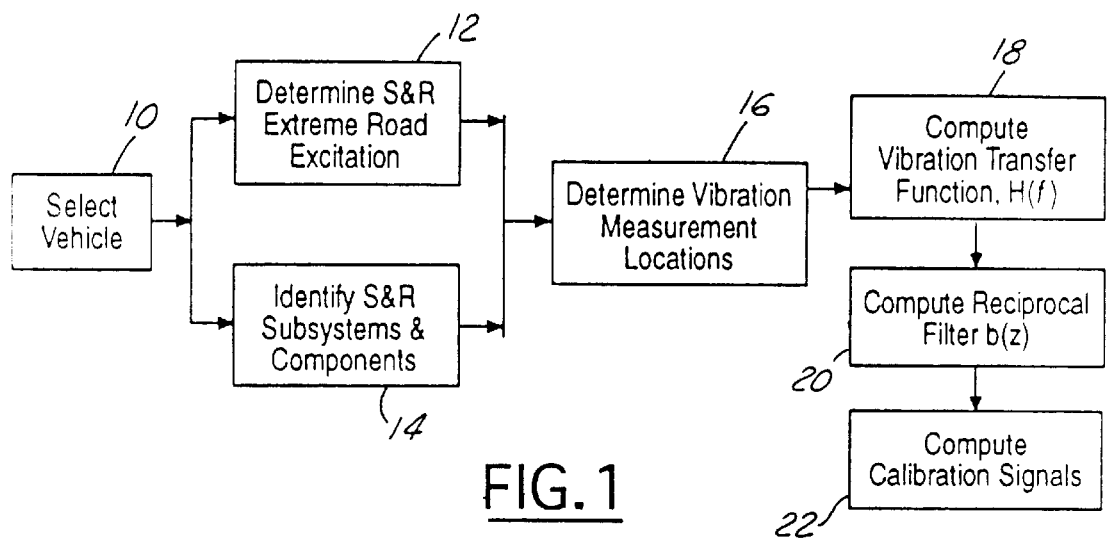
FIG. 1 is a flowchart showing a method for determining and reproducing noise inducing vibrations in a multi-component vehicle according to the present invention.

Turning now to the drawings, and in particular to FIG. 1 thereof, a method according to the present invention is shown in flowchart form. In Box 10, a vehicle for which squeak and rattle noise diagnosis is desired is selected. In Box 12, the selected vehicle is driven over a rough road at varying speeds in order to determine squeak and rattle. While being driven over the rough road, various subsystems and components throughout the vehicle are identified when squeak and rattle occurs (box 14). During this time, accelerometers are collecting data from various locations on the subsystems and components. As previously mentioned, some subsystems and components may have more than one accelerometer attached thereto in order to identify a vibration measurement location for a target component in the vehicle.

The step of identifying the vibration measurement location (box 16) comprises conducting a modal analysis of the target component at several test measurement locations to determine vibration characteristics of the component. This modal analysis, which is known in the art, involves determining a spectral energy content of vibrations sensed by the accelerometer at a given location. The modal analysis is performed to identify locations which are active points or nodal points. For purposes of this disclosure, an active point is a location in which vibrational energy input thereat will closely recreate vibrations induced in the component under driving conditions which cause squeak and rattle, while a nodal point is a location at which squeak and rattle will not be recreated despite vibrational energy being input thereat of a same level as that which initially caused squeak and rattle in the target component. It is thus important to identify the active points and the nodal points so as to be able to appropriately position a vibration generation device to the target component in order to recreate the unexpected noise in the form of squeak and rattle.

The vibration measurement locations, as determined above, are shown in Box 16 of FIG. 1. When these locations have been identified, a transfer function is computed (box 18), as further described below. From the transfer function, a reciprocal filter expression representing a transformation of an input signal to an output signal for a given target component is computed in Box 20. In Box 22, a set of calibration signals corresponding to a set of target component is determined using the reciprocal filtering technique. The calibration signals are those signals which, when sent to a vibration generating system attached at a given measurement location on a target component, will recreate the level and frequency content of vibrations which were measured on the road in conditions that produced unexpected noise in the form of squeak and rattle.

A set of calibration signals is preferably made for each component of a multi-component system. For example, in an automotive vehicle, a set of calibration signals is determined for the instrument panel, each closure, such as the front and rear doors and liftgate, and any other component on the vehicle interior which produces squeak and rattle during the road excitation (Box 12, FIG. 1). These calibration signals can then be recorded or saved, for example to a compact disk (CDROM) storage device or a magnetic cassette tape, for later use with devices to recreate the squeak and rattle while the vehicle, or other multi-component assembly, is stationary, as further described below.

Figure 2:
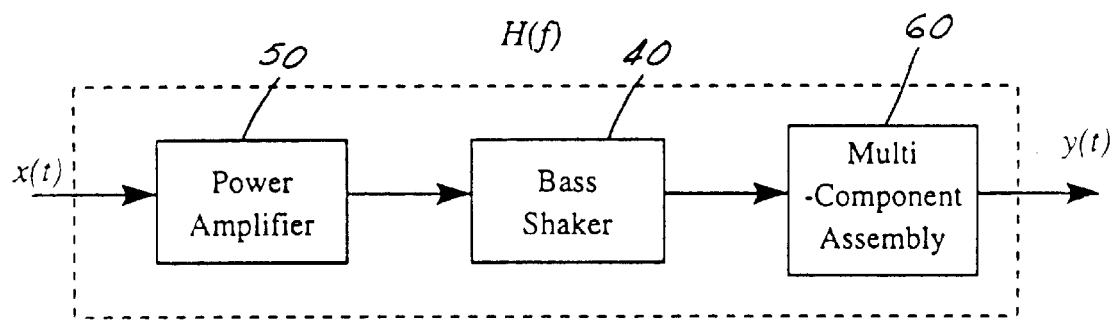
FIG. 2 is a schematic diagram showing determination of a transfer function of a multi-component assembly for use with the method of the present invention.

Referring now to FIG. 2, determination of a transfer function for a target component for use with the present invention is shown. Using white random noise as an input signal, x(t), to power a noise generation device such as a bass shaker 40 through an amplifier 50, the vibration response, y(t), of a target component of a multi-component assembly 60 can be measured as an output signal. Thus, a Transfer Function Estimate (TFE) or FRF, H(f), can be computed:

$$H(f) = \frac{Pxy(f)}{Pxx(f)},$$

where Pxy(f) represents the cross-power spectrum of x(t) and y(t) at frequency, f, and Pxx(f) represents the auto-power spectrum of x(t) at frequency, f. They are typically calculated using Fast Fourier Transform (FFT) techniques which convert signals from the time-domain to the frequency-domain.

The relation between a time signal x(t) sent to an excitation transducer and the time signal y(t) of the response transducer can be determined in the time domain (impulse response or frequency domain) transfer function. In a time domain approach, the impulse response of the system is determined by using an adaptive filter to calculate coefficients of a FIR (finite impulse response) filter. Once these coefficients are known, the inverse of the FIR filter is taken and a convolution is performed with the desired response to achieve the desired excitation.

While a time approach is possible, a frequency domain approach is preferably used to calculate an inverse transfer function of the mechanical system and then returned to the time domain by approximating this inverse transfer function with an FIR filter. When the coefficients of the FIR filter are known, performing a convolution between the FIR filter and the desired response yields the desired excitation. The convolution operation is numerically more stable when an FIR filter is used.

After the transfer function estimate is made, a reciprocal, or inverse, digital filter is realized (box 20, FIG. 1). A z-transform, commonly used in digital filtering, is used to represent the transformation of an input signal to an output response since difference equations characterizing such filters are transformed into algebraic equations which are usually much easier to manipulate. This is done by first determining the Transfer Function (TF) of a reciprocal filter, $H_R(f)$, which is defined as:

$$H_R(f) = 1/H(f).$$

Using the computed $H_R(f)$, a polynomial form of a z-transform expression for the reciprocal filter can be realized using digital filter design techniques. For example, if a Finite Impulse Response (FIR) method is chosen, a windowing technique can be used to calculated the filter coefficients, b(1), ... b(n+1), by applying an Inverse Fourier Transform (IFFT) to the specified frequency grid and multiplying by a window such as Hamming window. Such an FIR filer with known filter coefficients can be expressed as:

$$b(z) = b(1) + b(2)z^{-1} + \ldots + b(n+1)z^{-n}$$

where n−1 is the filter order. The FRF of this filter will be approximately the same as the pre-computed $H_R(f)$.

After the reciprocal filter is realized, a set of calibration, or drive, signals, $x_c(t)$, are calculated using the reciprocal filter b(z) and the desired response signal $y_d(t)$ such as the vibrations measured on road. The filter operation at sample k is given by the time-domain difference equation:

$$x_c(k) = b(1)*y_d(k) + b(2)*y_d(k-1) + \ldots + b(n+1)*y_d(k-n)$$

This digital calibration signal, $x_c(k)$, will be converted into an analog signal, $x_c(t)$, using a Digital-to-Analog Converter (DAC) to drive a power amplifier and a bass shaker.

After the calibration signals have been determined, squeak and rattle noise in the vehicle can be identified by placing a vibration generation device, such as a bass shaker, at a predetermined vibration measurement location of the target component. The calibration signals are then used to drive the vibration generation device to vibrate the bass shaker, which in turn vibrates the target component with energy content spread over an appropriate frequency range so as to induce squeak and rattle vibrations in the target component. If the target component to which the bass shaker is attached does not squeak and rattle when vibrated, the procedure can be repeated with other vehicle components, for which calibration signals have been calculated, until the noise source is identified.

Figure 3:
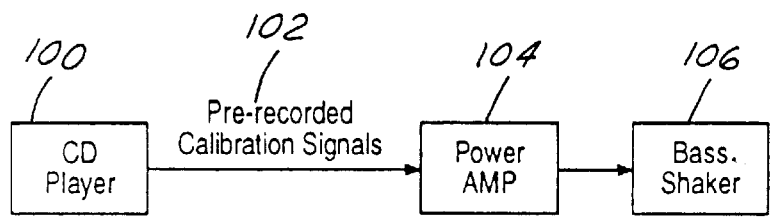
FIG. 3 is schematic diagram of a system for reproducing noise inducing vibrations in a target component according to the present invention.

In FIG. 3, a schematic diagram shows the above described method. A CD player 100 plays pre-recorded calibration signals 102 from a compact disc (CD, not shown) which preferably has several tracks, each with a set of calibration signals corresponding to a target component. The calibration signals 102 are thus converted from a digital form to an analog form and then amplified by amplifier 104. The amplified signal is sent to the bass shaker 106 which is attached to the selected target component.

Figure 4:
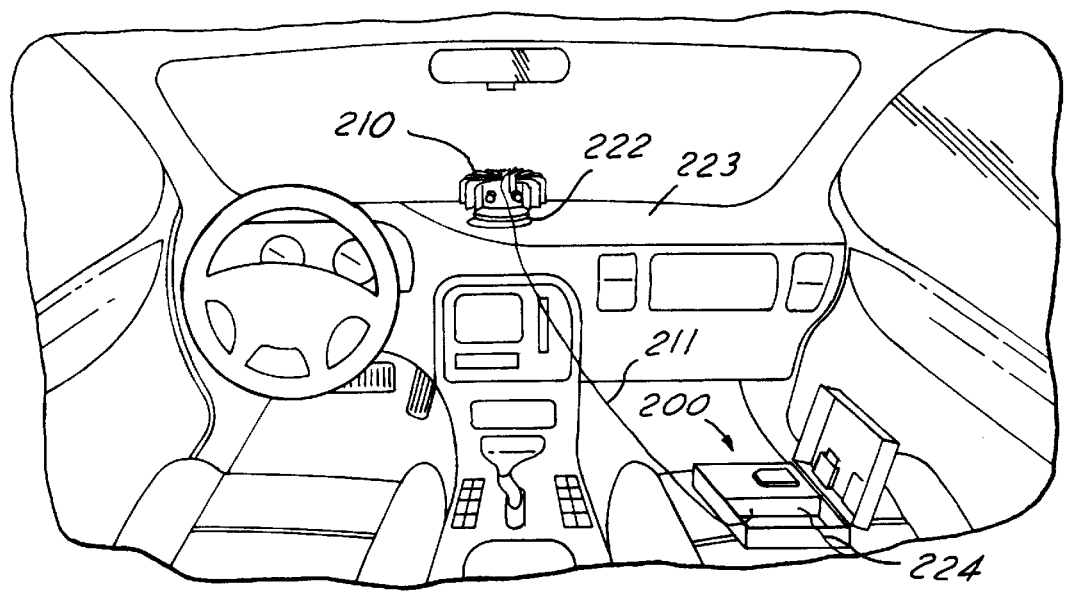
FIG. 4 is a perspective interior view of a vehicle passenger compartment shown with a kit disposed therein according to the present invention for reproducing noise inducing vibrations in an instrument panel according to the present invention.
Figure 5:
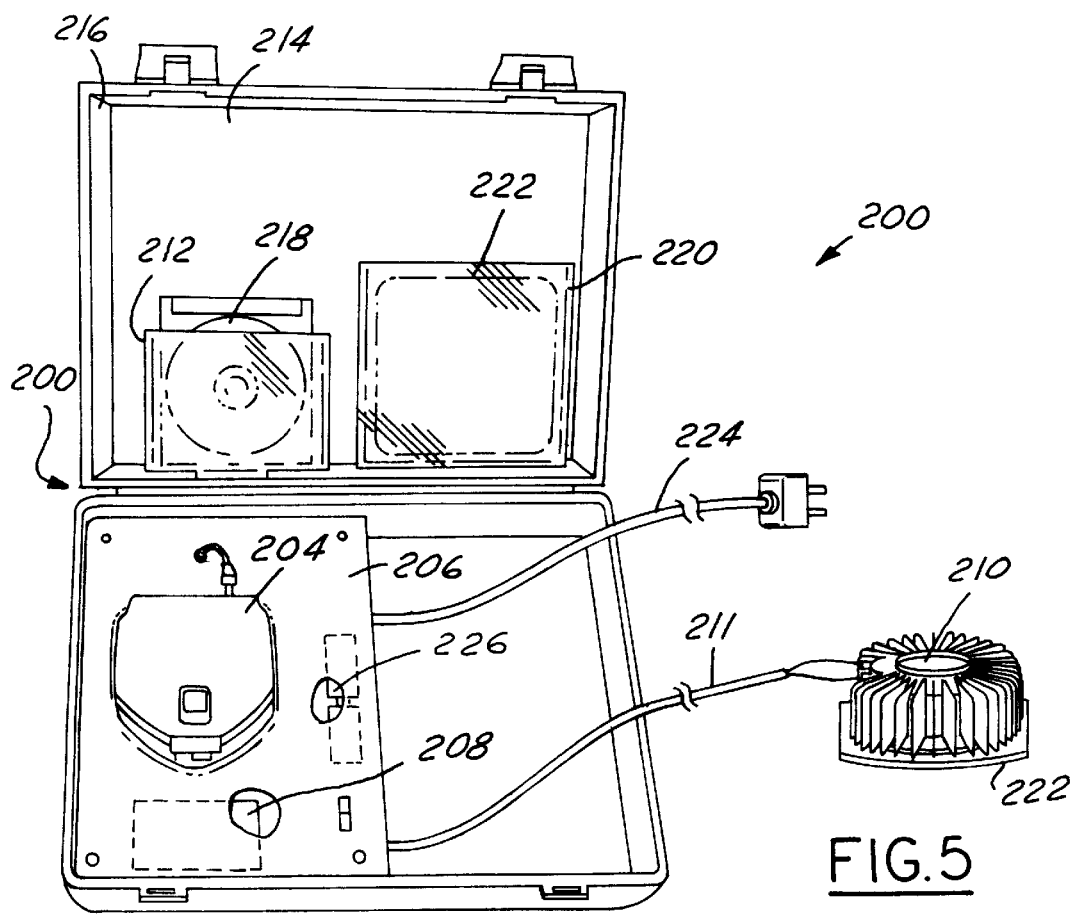
FIG. 5 is a perspective view of a noise reproduction kit according to the present invention.

A kit 200 is shown in FIGS. 4 and 5 for conveniently carrying out the squeak and rattle identification method of the present invention. As seen in FIG. 5, the kit has a portable case 202 which contains a CD player 204 mounted in a support panel 206. The CD player 204 is connected to an amplifier 208, preferably stored below the panel 206, which in turn is connected to a vibration generating device, or tactile transducer, such as a base shaker 210. The base shaker 210, also known as an inertial actuator, typically consists of a mass that is moved back and forth along an axis using an electromagnetic voice coil. The back and forth movement of the mass generates inertial forces that are transmitted to the external casing through the shaft. Fixing the external casing to a structure allows the transmission of these forces to the structure itself. Other vibration generating devices may also be used, for example a piezoelectric based inertial actuator system or a bass speaker. The base shaker 210 has a retractable cord 211 which permits the base shaker to be positioned at a predetermined distance from the portable case 202, as best seen in FIG. 4.

Referring again to FIG. 5, the kit 200 has a sleeve 212 on an inner surface 214 of the lid 216 for receiving a CD 218. As previously mentioned, the CD 218 has calibration signals stored on several tracks corresponding to various components in the vehicle which are known to possibly produce squeak and rattle. The calibration signals are determined by the above described method. A second sleeve 220 contains a dual sided tape 222 (FIG. 5) for attaching the base shaker to a target component, such as to the instrument panel 223 of a vehicle (FIG. 4). One side of the tape attaches to the bottom of the base-shaker and the other side attaches to the instrument panel. Other attachment means may also be used, such as clamps, wires, and single-sided tape.

The kit 200 has a power cord 224 which connects to an external source for supplying power to the CD player 204 and amplifier 208. Additionally, the kit 200 preferably has a battery 226, stowable beneath the panel 202, to supply power to the various kit components.

Those skilled in the art will recognize that other signal generation drive means can be used other than the CD player, such as a magnetic tape player. A magnetic cassette tape with the appropriate calibration signals stored thereon would be played on the tape player. A personal computer (PC) could also be used to store and send the appropriate signals to the amplifier.

Data acquisition, particularly required for boxes 16–22 of FIG. 1, can be accomplished with a portable computer configured with an appropriate data acquisition card. The data acquisition card may have, for example, two 12-bit analog-to-digital converters that can be simultaneously sampled with a predetermined input range, for example, plus or minus 2.5 volts. The system also has two 12-bit digital-2-analog converters with a plus or minus 5 volt output range. These inputs are used for recording time signals to compute a frequency response function (FRF) between the excitation transducer, e.g. base shaker, and an accelerometer, while the output signal is used to generate the signals needed for various measurements (FIG. 2). Various software programs can be used to perform the computations required for the transfer function, reciprocal filtering, and calibration signals. A signal generator is also implemented on the PC, which can be a random signal generator or a arbitrary time signal loaded from a previously saved file. Various signal sampling parameters, such as the sampling frequency, the length of time signal, the input channel, and the file format to save the time signals, can be selected through software, preferably using graphical user interface (GUI).

Although the preferred embodiments of the present invention has been disclosed, various changes and modifications may be made without departing from the scope of the invention as set forth in the appended claims.

What is claimed is:

1. A kit for diagnosing noise from a target component of a multi-component assembly, the kit comprising:

vibration generation means adapted for attachment to the target component at a predetermined location for vibration thereof;

drive means for driving the vibration generation means, wherein the drive means comprises a CD player; and control means for controlling the vibration generation means through the drive means so as to generate a set of predetermined noise producing vibrations in the target component.

2. A kit according to claim 1 wherein the vibration generation means comprises a bass shaker.

3. A kit according to claim 1 wherein the vibration generation means comprises a bass speaker.

4. A kit according to claim 1 wherein the control means comprises a CD having a predetermined set of control signals thereon which are read by the drive means and converted to electrical signals sent to the vibration generation means for causing noise inducing vibrations of the target component.

5. A system for diagnosing noise from a target component of a multi-component assembly, the system comprising:

vibration generation means for vibrating the target component at a predetermined location thereof;

attachment means for attaching the vibration generation means to the target component;

drive means for driving the vibration generation means, wherein the drive means comprises a CD player; and control means for controlling the vibration generation means through the drive means so as to generate a set of predetermined noise producing vibrations in the target component.

6. A system according to claim 5 wherein the vibration generation means comprises a bass shaker.

7. A system according to claim 5 wherein the attachment means comprises two-sided adhesive tape.

8. A system according to claim 5 wherein the control means comprises a CD having a predetermined set of control signals thereon which are read by the drive means and converted to electrical signals sent to the vibration generation means for causing noise inducing vibrations of the target component.

9. A system according to claim 5 wherein the predetermined set of control signals comprises a set of calibration signals determined with a reciprocal filter in conjunction with a set of vibration data at a predetermined vibration measurement location of the target component when the multi-component assembly is vibrated.

10. A kit for diagnosing noise from a target component of a multi-component assembly, the kit comprising:

an amplifier;

a tactile transducer connected to the amplifier for selectively vibrating the target component at a predetermined location thereof;

attachment means for attaching the vibration generation means to the target component;

a compact disc (CD) player connected to the amplifier for driving the tactile transducer; and a CD having at least one set of predetermined control signals thereon for controlling the vibration generation means when played by the CD player and amplified so as to generate a set of predetermined noise producing vibrations in the target component.

11. A kit according to claim 10 wherein the CD has a plurality of sets of predetermined control signals thereon corresponding to a plurality of target components in each of the sets of predetermined control signals tailored to cause noise producing vibrations in the corresponding target component when vibrated by the tactile transducer.

12. A kit according to claim 10 including a power source connectable with the amplifier and the CD player.

13. A kit according to claim 10 including a portable case for containing the amplifier, the tactile transducer, the CD player, the CD and the attachment means therein.

14. A kit according to claim 13 wherein the portable case includes a retractable electrical connector.

15. A kit according to claim 10 wherein the tactile transducer comprises a bass shaker.

* * * * *